US009106042B2

(12) United States Patent
Maggert et al.

(10) Patent No.: US 9,106,042 B2
(45) Date of Patent: Aug. 11, 2015

(54) BATTERY CONNECTOR SYSTEM

(75) Inventors: Kevin K. Maggert, Lawrenceville, GA (US); Christopher D. Crawford, Hollywood, FL (US); Charles W. Friedli, Lawrenceville, GA (US); Curtis L. Whetten, Suwanee, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 1235 days.

(21) Appl. No.: 12/494,440

(22) Filed: Jun. 30, 2009

(65) Prior Publication Data

US 2010/0330935 A1 Dec. 30, 2010

(51) Int. Cl.

| | |
|---|---|
| ***H04B 1/38*** | (2015.01) |
| ***H01R 11/00*** | (2006.01) |
| ***H01M 6/00*** | (2006.01) |
| ***H01R 43/24*** | (2006.01) |
| *H01R 43/16* | (2006.01) |

(52) U.S. Cl.

CPC ................ *H01R 43/24* (2013.01); *H01R 43/16* (2013.01); *H01R 2201/16* (2013.01); *Y10T 29/49108* (2015.01)

(58) Field of Classification Search

USPC ....................... 455/572, 575.1, 90.3; 439/504

See application file for complete search history.

(56) References Cited

U.S. PATENT DOCUMENTS

| | | | | |
|---|---|---|---|---|
| 4,578,628 | A * | 3/1986 | Siwiak | 320/127 |
| 4,648,125 | A * | 3/1987 | Brown | 455/575.1 |
| 4,979,903 | A * | 12/1990 | Gosselin | 439/78 |
| 5,203,022 | A * | 4/1993 | Finch et al. | 455/127.1 |
| 5,704,803 | A * | 1/1998 | Oshima et al. | 439/500 |
| 5,816,847 | A * | 10/1998 | Snyder | 439/500 |
| 6,355,374 | B1 * | 3/2002 | Wirsching | 429/96 |
| 6,461,764 | B1 * | 10/2002 | Nakamura | 429/170 |
| 6,554,640 | B1 | 4/2003 | Koike et al. | |
| 7,092,746 | B2 * | 8/2006 | Infanti | 455/575.1 |
| 7,416,445 | B1 | 8/2008 | Brown | |
| 2003/0003357 | A1 * | 1/2003 | Tamai et al. | 429/181 |
| 2003/0082441 | A1 * | 5/2003 | Hovi et al. | 429/123 |
| 2005/0208346 | A1 * | 9/2005 | Moon et al. | 429/7 |
| 2005/0272479 | A1 * | 12/2005 | Infanti | 455/572 |
| 2006/0024575 | A1 * | 2/2006 | Robinson et al. | 429/185 |

(Continued)

OTHER PUBLICATIONS

International Search Report & Written Opinion for International Application No. PCT/US2010/037976 mailed on Aug. 23, 2010.

(Continued)

*Primary Examiner* — Nay A Maung
*Assistant Examiner* — Erica Fleming-Hall
(74) *Attorney, Agent, or Firm* — Barbara R. Doutre

(57) ABSTRACT

A battery connector system for connecting a battery to a battery powered device is provided herein that includes an insert molded contact block comprising a contact block, a plurality of electrical contacts insert molded into the contact block, and an outer electrical connection for electrically coupling the plurality of electrical contacts to the battery powered device. The battery connector system further includes an inner electrical connection located on a housing enclosure for electrically coupling the battery housed in the housing enclosure to the outer electrical connection through the plurality of electrical contacts. The battery connector system further includes a sealed electrical path between the inner electrical connection and the outer electrical connection, wherein the sealed electrical path is formed by over molding the insert molded contact block with the housing enclosure.

20 Claims, 7 Drawing Sheets

(56) References Cited

U.S. PATENT DOCUMENTS

| | | | | |
|---|---|---|---|---|
| 2006/0057872 | A1* | 3/2006 | Ho et al. | 439/95 |
| 2006/0244413 | A1* | 11/2006 | Zedell et al. | 320/107 |
| 2007/0247136 | A1* | 10/2007 | Wallmark et al. | 323/371 |
| 2008/0125197 | A1* | 5/2008 | Hongo et al. | 455/575.3 |
| 2008/0152994 | A1* | 6/2008 | Yamagami et al. | 429/100 |
| 2008/0274772 | A1* | 11/2008 | Nelson et al. | 455/572 |
| 2009/0051318 | A1* | 2/2009 | Paul et al. | 320/114 |
| 2009/0116202 | A1* | 5/2009 | Kim et al. | 361/752 |
| 2009/0221331 | A1* | 9/2009 | Crawford et al. | 455/572 |
| 2010/0081015 | A1* | 4/2010 | Kim et al. | 429/7 |
| 2010/0092859 | A1* | 4/2010 | Kim et al. | 429/178 |
| 2010/0209752 | A1* | 8/2010 | Lerner et al. | 429/97 |

OTHER PUBLICATIONS

Corresponding Australian Application No. 2010266609—First Office Action—mailing date May 20, 2013.

Corresponding Canadian Application No. 2766389—First Office Action—mailing date May 21, 2013.

* cited by examiner

BATTERY CONNECTOR SYSTEM

FIELD OF THE DISCLOSURE

The present disclosure relates generally to a battery connector system and more particularly to a sealed connection from a battery to a battery powered device.

BACKGROUND

With the increased functionality of mobile communication devices, particularly in the area of battery powered portable two-way radios, users are more likely to consume significant power from the battery. Many users working in the public safety arena, such as firefighters and police, rely on an uninterrupted power supply from the battery across a variety of environments, including drop, vibration, and water exposure. Interruption in power supply can occur due to weak physical and/or electrical connection between the battery and the battery powered device. One of the critical parameters for Public Safety is for the radio to be capable of meeting rugged submersion requirements. This implies the battery must remain functional under extreme drop conditions while maintaining a water tight seal. Failure to remain sealed can place the user at grave risk due to either a temporary or permanent loss of communication. When the battery is reconnected to the device, power is restored, but the device may need time to reboot and become fully operational again. Thus, electrical interfaces between the battery and the device face some of the toughest challenges to maintain a solid physical and electrical connection across the above said environments.

One design option for such electronic devices is a protruding battery contact design which can mitigate problematic radio resets and address radio/battery contact interface sealing issues. However, this protruding battery contact design posed tooling and sealing issues. The problems faced included providing an electrical connection from outside the battery pack to inside the pack; maintaining a water tight seal in the battery compartment; providing a means to seal the battery/radio interface; maintaining a water tight seal after drop impacts to the protruding contact and designing a manufacturable product to achieve the required properties. As such, it would be beneficial to have reliable physical and electrical connection between the battery and the communication device for tough environments.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
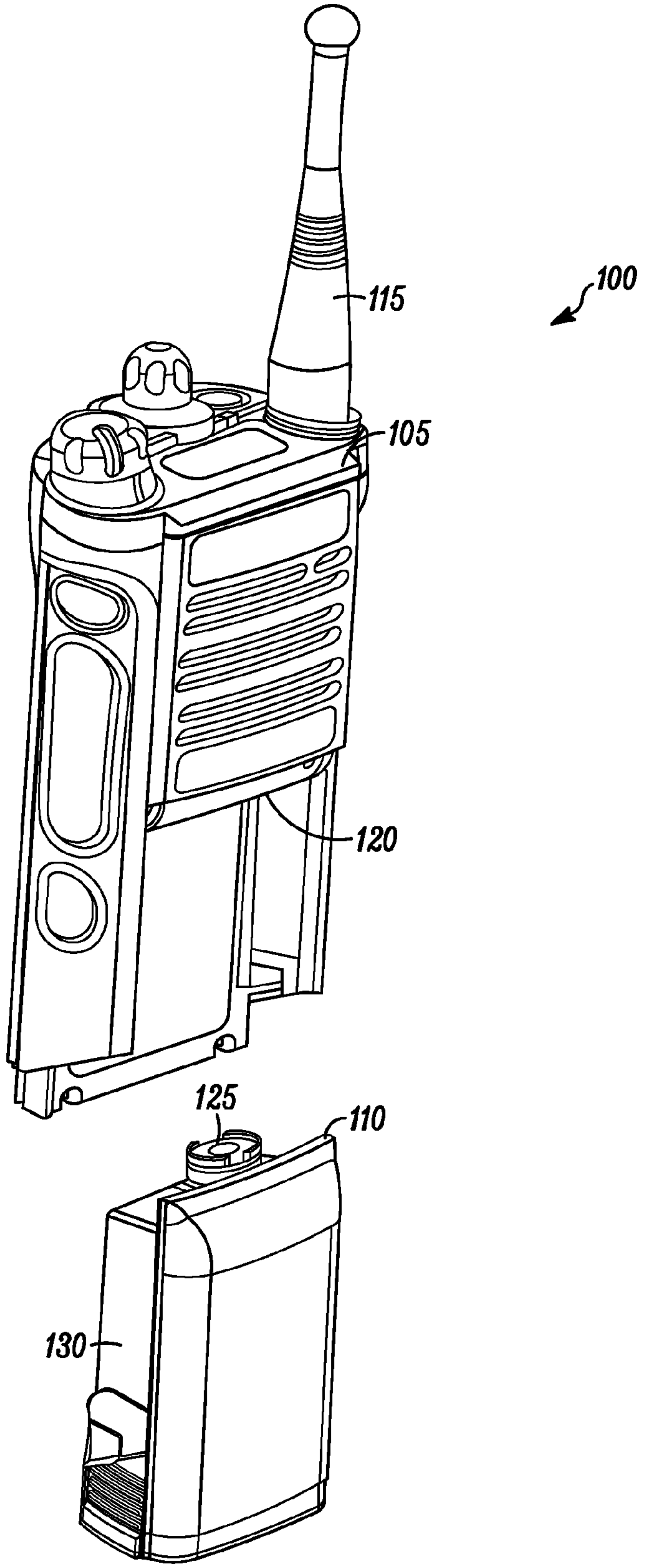
FIG. 1 illustrates a perspective view of a battery powered device receiving a sealed battery connector system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A battery connector system for connecting a battery to a battery powered device is provided herein that includes an insert molded contact block comprising a contact block, a plurality of electrical contacts insert molded into the contact block, and an outer electrical connection for electrically coupling the plurality of electrical contacts to the battery powered device. The battery connector system further includes an inner electrical connection located on a housing enclosure for electrically coupling the battery housed in the housing enclosure to the outer electrical connection through the plurality of electrical contacts. The battery connector system further includes a sealed electrical path between the inner electrical connection and the outer electrical connection, wherein the sealed electrical path is formed by over molding the insert molded contact block with the housing enclosure.

FIG. 1 is a perspective view illustrating a battery powered device 100 such as a communication device in accordance with an embodiment of the invention. Although a two way radio is illustrated for explanation purposes, the battery powered device 100 can be any battery powered device such as a portable radio, a mobile phone, a handheld device, a laptop, a music player, a digital camera, or the like. The battery powered device 100 comprises a radio 105 and a battery connector system 110. The radio 105 is capable of receiving the battery connector system 110. Although not illustrated in detail, it will be appreciated by those of ordinary skill in the art that the radio 105 can include, for example, electronic components such as one or more of a processor, a transmitter and a receiver (or a transceiver), an antenna 115, a display, an input device, a memory, one or more communication interfaces, and the like.

The radio 105 further comprises a plurality of radio contacts 120 that are used to electrically couple the radio 105 with the battery connector system 110. The battery connector system 110 comprises an insert molded contact block 125 and a housing enclosure 130. The insert molded contact block 125 comprises a plurality of electrical contacts 305 (see FIG. 3) that is insert molded into a contact block. As used herein, insert molding is a molding process whereby materials such as metal stampings, mechanical parts, or the like are molded into a single component through the injection of thermoplastics. The housing enclosure 130 (also referred to as battery housing) houses a battery to power the battery powered device 100. The battery, for example can be a chargeable battery such as Lithium ion battery, Nickel Metal Hydride battery, Nickel Cadmium battery, or the like. In accordance with embodiments of the invention, the insert molded contact block 125 is over molded with the housing enclosure 130 for providing a sealed electrical connection to the battery powered device 100.

Figure 2:
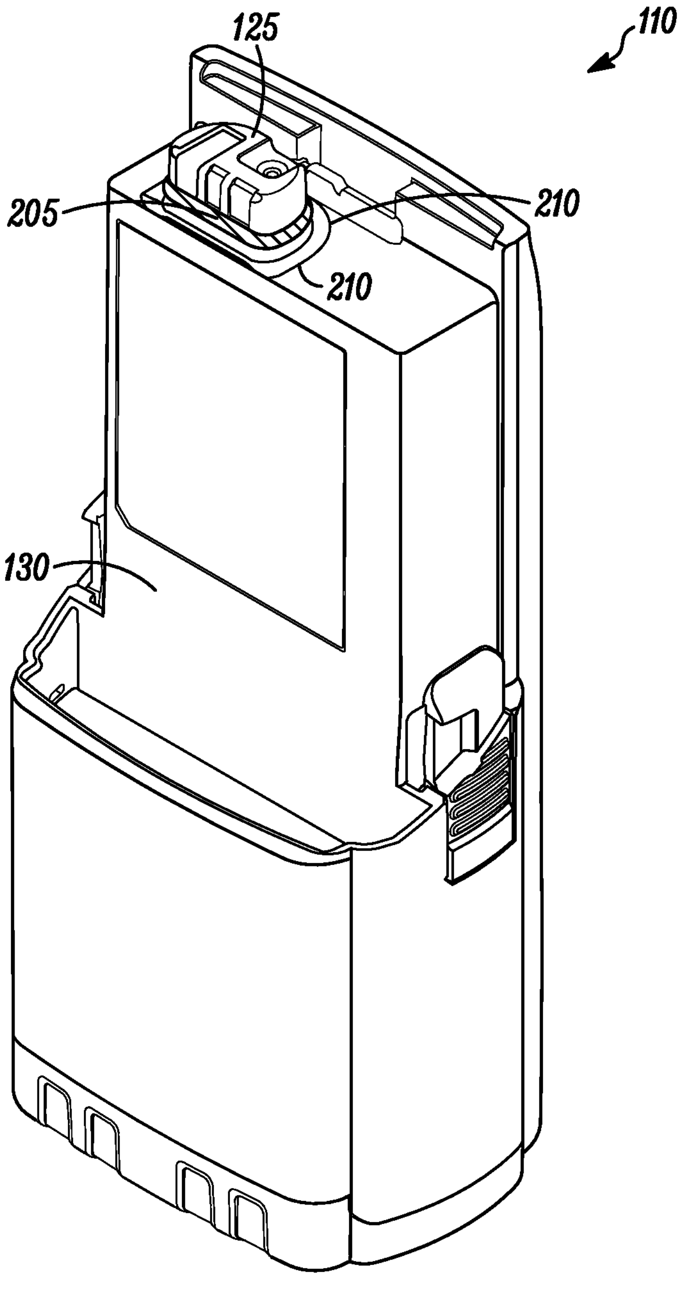
FIG. 2 illustrates a perspective view of the battery connector system in accordance with some embodiments.

FIG. 2 illustrates a perspective view of the battery connector system 110 in accordance with some embodiments. The battery connector system 110 includes the insert molded contact block 125. The insert molded contact block 125 is over molded with the housing enclosure 130 to form the battery connector system 110 for providing a sealed electrical connection between the battery housed in the housing enclosure 130 and the battery powered device 100. As used herein, over molding is a multi-material molding process along with insert, two-shot, or sandwich molding. Further, the overmold is injection molded around, over, under, or through a substrate material, wherein the injection can be done with a multishot process or by insert molding. The insert molded contact block 125 comprises an O-ring 205 for providing a radial seal to seal an electrical connection at an interface between the battery powered device 100 and the battery connector system 110. The O-ring 205 can be made of any material that is water resistant, moldable, and elastic. For example, the O-ring 205 can be fabricated from one or more of silicon, nitrile, fluorocarbon, chloroprene rubber, thermoplastic elastomer, thermoplastic urethane, and ethylene propylene rubber. The insert molded contact block 125 further comprises a bond 210, which can be, for example, a material to material adhesion or a plastic to plastic adhesion. The bond 210 is formed between the insert molded contact block 125 and the housing enclosure 130 during the process of over molding of the insert molded contact block 125 with the housing enclosure 130. The bond 210 provides water proofing and shock proofing of the battery housed in the housing enclosure 130. According to one embodiment of the invention, the insert molded contact block 125 and the housing enclosure 130 are fabricated from plastic, and consequently the plastic to plastic adhesion occurs during the process of over molding. The insert molded contact block 125 and the housing enclosure 130 can also be fabricated using other suitable materials, for example rubber.

Figure 3:
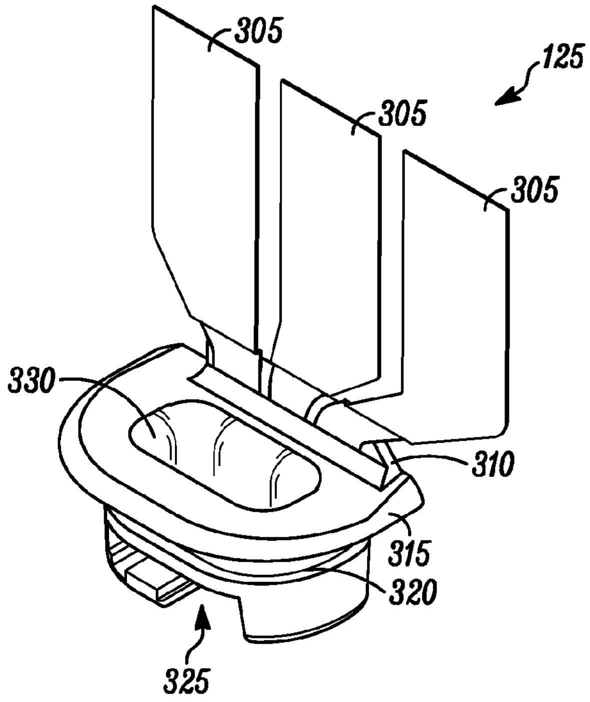
FIG. 3 illustrates a detailed view of an insert molded contact block in accordance with some embodiments.

Referring to FIG. 3, the insert molded contact block 125 comprises a plurality of electrical contacts 305. The plurality of electrical contacts 305 can be made of any conductive material, for example silver, copper, gold, aluminum, iron, bronze, or the like, to provide the electrical connection from the battery to the battery powered device 100. The plurality of electrical contacts 305 can further be stamped in order to provide a plurality of bends 905 (see FIG. 9). As used herein, stamping includes sheet-metal forming manufacturing processes such as blanking, bending, embossing, or the like. The plurality of electrical contacts 305 is molded into a contact block to form the insert molded contact block 125.

Further, FIG. 3 illustrates geometry of the insert molded contact block 125 in accordance with some embodiments. The geometry of the insert molded contact block 125 comprises a support ledge 310, a perimeter back angle 315, a groove 320, and a locking feature 325, 330. The support ledge

310 is located at a base portion of the insert molded contact block 125. The support ledge 310 protects the plurality of electrical contacts 305, for example, from exposure to heat during the process of over molding of the insert molded contact block 125 with the housing enclosure 130. The perimeter back angle 315 along a bottom curvature portion of the insert molded contact block 125 provides a positive holding pressure during the process of over molding. The groove 320 is disposed above the perimeter back angle 315, and further along a curvature proximal to a top portion of the insert molded contact block 125. The groove 320 provides housing for the O-ring 205. The locking feature 325, 330 is proximal to an outer electrical connection 505 (see FIG. 5). As shown in FIG. 3, element 330 of the locking feature 325, 330 refers to an aperture through which material of the housing enclosure 130 flows during the process of over molding and element 325 of the locking feature 325, 330 enables locking of the insert molded contact block 125 with the housing enclosure 130. The perimeter back angle 315 and the locking feature 325, 330 help to maintain the geometry of the insert molded contact block 125 during the process of over molding. The locking feature 325, 330 further helps to hold the insert molded contact block 125 during the process of over molding so as to retain the geometry of the insert molded contact block 125. Thus, the locking feature 325, 330 also prevents formation of potential leak paths into the battery.

Figure 4:
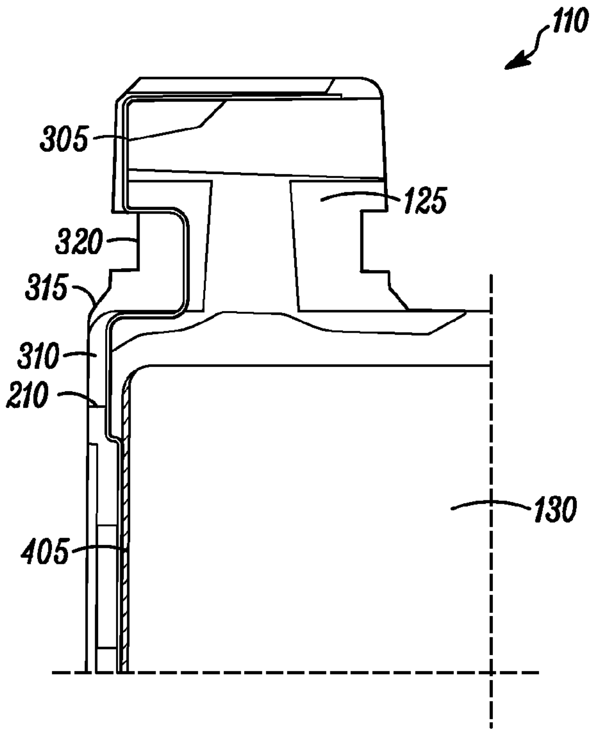
FIG. 4 illustrates a detailed view of the battery connector system in accordance with some embodiments.

FIG. 4 is a detailed view of the battery connector system 110. FIG. 4 illustrates another view of the bond 210 that is formed during the process of over molding of the insert molded contact block 125 and the housing enclosure 130. The plurality of electrical contacts 305 as illustrated extend from the insert molded contact block 125 to the battery housed in the housing enclosure 130. The support ledge 310 is disposed on the base portion of the insert molded contact block 125 to protect the plurality of electrical contacts 305 during the process of over molding. The perimeter back angle 315 is disposed along the bottom curvature portion of the insert molded contact block 125 for providing positive holding pressure during the process of over molding. The groove 320 in the insert molded contact block 125 is used for housing the O-ring 205. The O-ring 205 disposed in the groove 320 forms the radial seal between the battery connector system 110 and the battery powered device 100. The battery connector system 110 further comprises a water resistant sheet 405 disposed in the housing enclosure 130. The water resistant sheet 405 prevents water from entering the battery under submerged conditions. According to some embodiments of the invention, the water resistant sheet 405 surrounds an inner electrical connection 510 (see FIG. 5) (or access ports to the battery housed) in the housing enclosure 130. Further, in accordance with some embodiments of the invention, the water resistant sheet 405 is made of a polycarbonate resin thermoplastic sheet. In one embodiment, the water resistant sheet 405 can be fabricated from plastic, paint, a metal foil, or a water resistant label.

Figure 5:
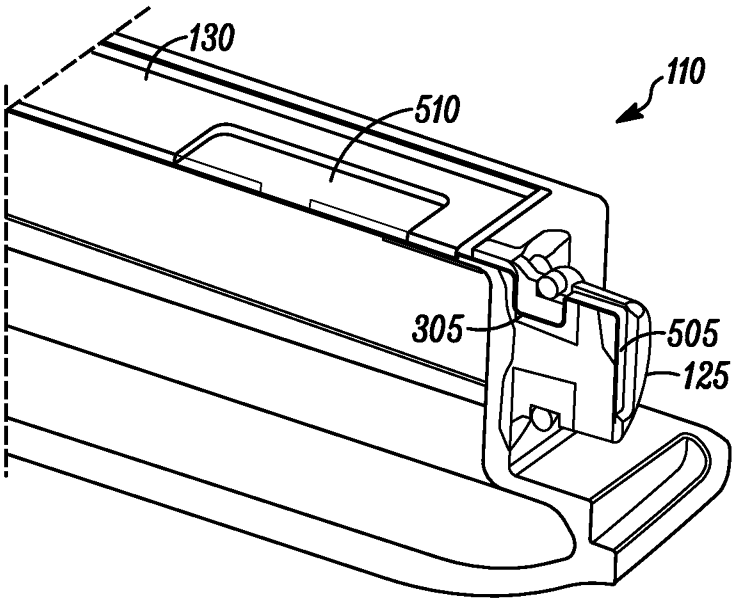
FIG. 5 illustrates a cross-sectional view of the battery connector system in accordance with some embodiments.

FIG. 5 illustrates a cross-sectional view of the battery connector system 110. In FIG. 5, the plurality of electrical contacts 305 is shown extending from an outer electrical connection 505 to an inner electrical connection 510. The outer electrical connection 505 is located on the insert molded contact block 125 and is formed at a position where the plurality of electrical contacts 305 are insert molded with the contact block. The outer electrical connection 505 provides electrical coupling of the plurality of electrical contacts 305 with the battery powered device 100. The inner electrical connection 510 is located on the housing enclosure 130 and is formed at a position where the plurality of electrical contacts

305 are coupled to the battery housed in the housing enclosure 130. The inner electrical connection 510 provides electrical coupling of the plurality of electrical contacts 305 with the battery housed in the housing enclosure 130 and therein electrically couples the battery to the outer electrical connection 505 through the plurality of electrical contacts 305. As such, a sealed electrical path is formed between the outer electrical connection 505 and the inner electrical connection 510.

Figure 6:
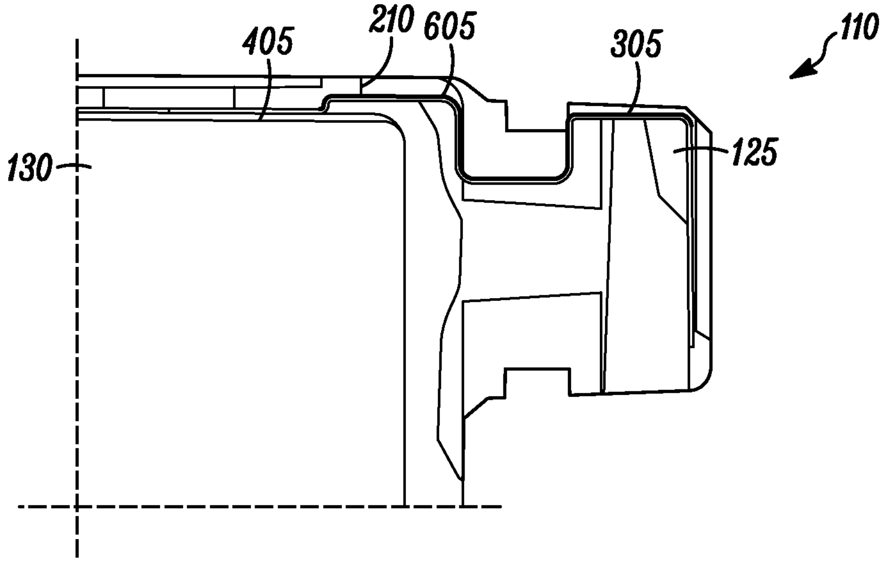
FIG. 6 illustrates a view of the battery connector system illustrating a potential leak path in accordance with some embodiments.
Figure 7:
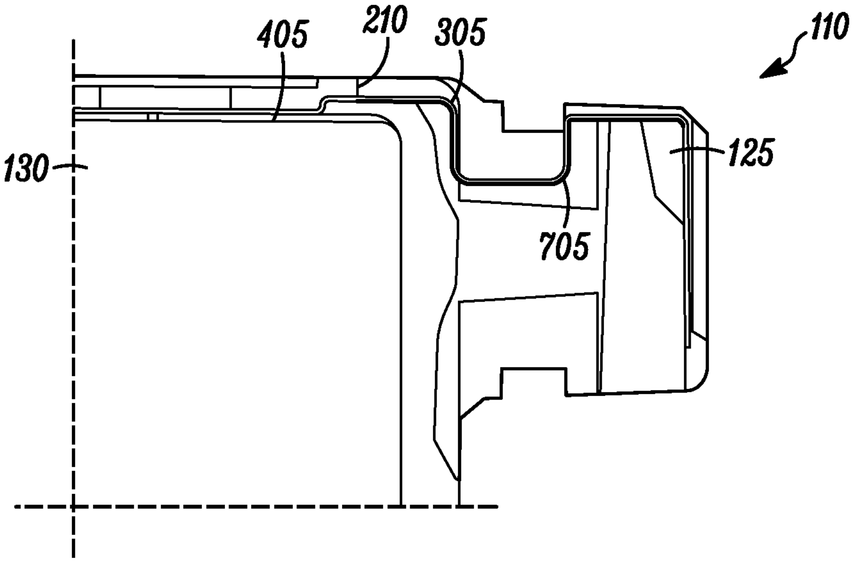
FIG. 7 illustrates a view of the battery connector system illustrating a potential leak path in accordance with some embodiments.
Figure 8:
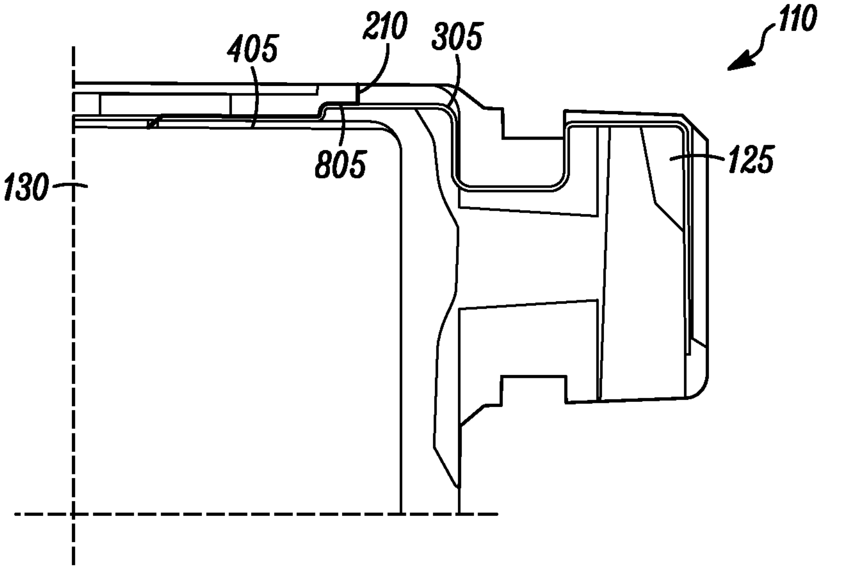
FIG. 8 illustrates a view of the battery connector system illustrating a potential leak path in accordance with some embodiments.

FIGS. 6, 7, and 8 illustrate a plurality of potential leak paths 605, 705, 805 in the battery connector system 110, that are sealed in accordance with embodiments of the invention. As used herein, the term "potential leak path" refers to a path along which water can enter the battery under conditions of the battery powered device 100 coming in contact with water, and cause disruption of power supply from the battery to the battery powered device 100. In accordance with embodiments of present invention, a sealing mechanism, such as bond 210 and water resistant sheet 405, is provided for sealing such potential leak paths. FIGS. 6 and 7 illustrate a top and a bottom view of potential leak paths 605, 705 that can be formed, for example during submerged conditions, along the plurality of electrical contacts 305. In one example, the potential leak paths 605, 705 can be formed between the electrical contact material (e.g., metal) and the insert molded contact block material (e.g., plastic). These potential leak paths 605, 705 can be alternatively called metal leak paths. FIG. 8 illustrates another potential leak path 805 that is formed between the electrical contact material (e.g., metal) and the housing enclosure material (e.g., plastic). The potential leak path 805 can be alternatively called interface leak path. The plurality of potential leak paths 605, 705, 805 are sealed off by the water resistant sheet 405 disposed in the housing enclosure 130. The bond 210 also helps in sealing off the plurality of potential leak paths and thereby prevents water from entering into the battery. Further, stamping of the plurality of electrical contacts 305 also prevents water from entering through the potential leak paths. As a result of the stamping, a plurality of bends 905 (see FIG. 9) is formed along the plurality of electrical contacts 305. The plurality of bends 905 (see FIG. 9) along the plurality of electrical contacts 305 increases resistance to leakages along the plurality of potential leak paths (605, 705 and 805).

Figure 9:
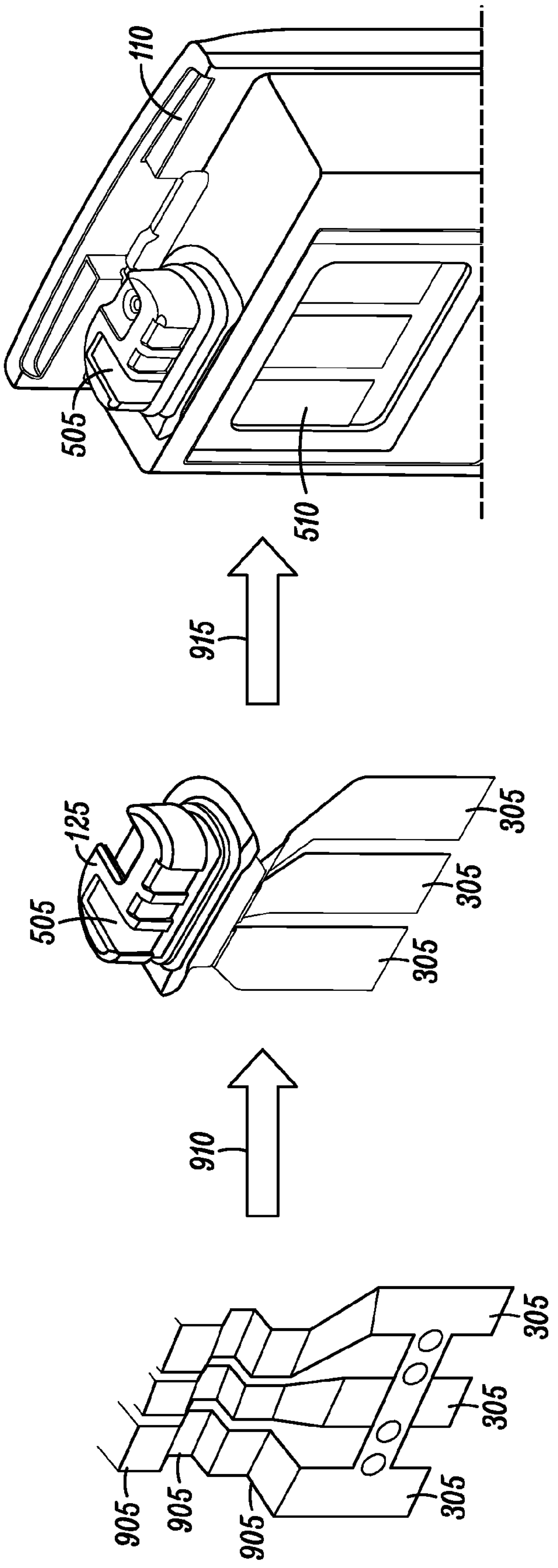
FIG. 9 illustrates portions of a process of constructing a battery connector system for use in connecting a battery and a battery powered device in accordance with some embodiments

FIG. 9 illustrates portions of a process of constructing a battery connector system 110 for use in connecting the battery and the battery powered device 100. The figure illustrates providing and stamping the plurality of electrical contacts 305. The plurality of electrical contacts 305 are stamped to form a plurality of bends 905 along the plurality of electrical contacts 305. The plurality of bends 905 along the plurality of electrical contacts 305 increases resistance to leakages along the plurality of potential leak paths (605, 705, and 805). The plurality of electrical contacts 305 is insert molded (910) with the contact block to form the insert molded contact block 125. Next, the insert molded contact block 125 is over molded (915) with the housing enclosure 130 to form the battery connector system 110 and for providing a sealed electrical path from the battery to the battery powered device 100.

Figure 10:
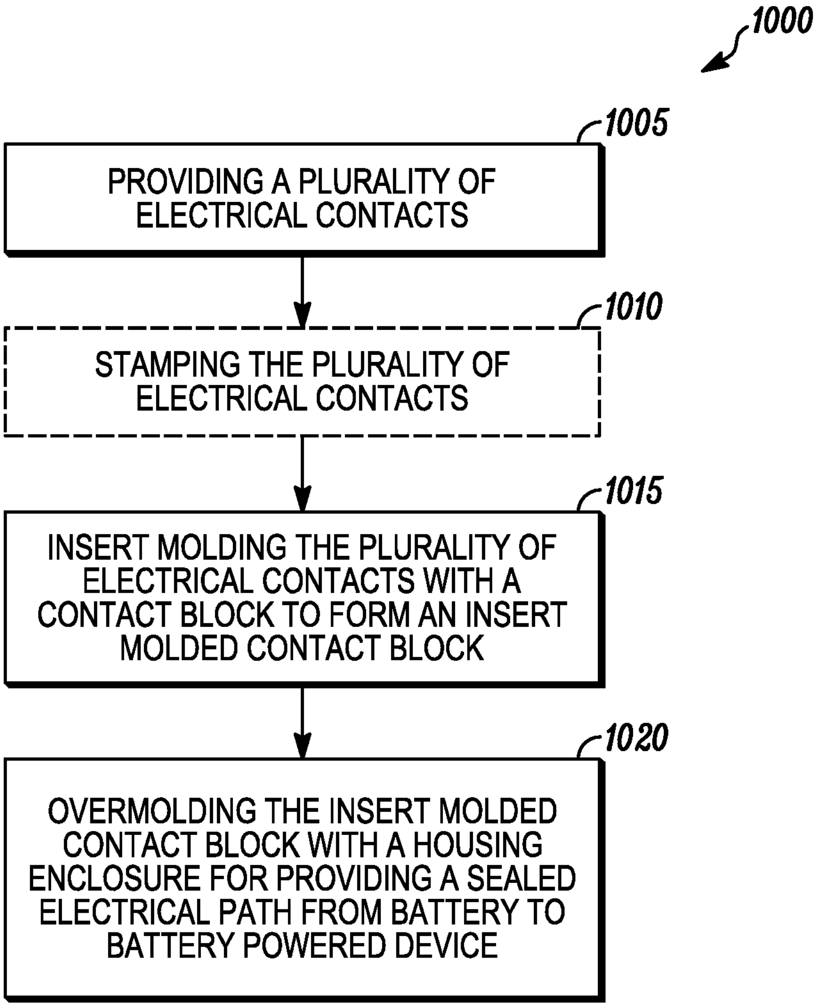
FIG. 10 is a flowchart of a method of constructing a battery connector system for use in connecting a battery and a battery powered device in accordance with some embodiments.

FIG. 10 is a flowchart describing a method 1000 of constructing a battery connector system 110. At block 1005, the plurality of electrical contacts 305 is provided. The plurality of electrical contacts 305 is then stamped to form a plurality of bends 905 in the plurality of electrical contacts 305 as shown in block 1010. Next, at block 1015, the plurality of electrical contacts 305 is insert molded with the contact block to form the insert molded contact block 125. At block 1020, the insert molded contact block 125 is over molded with the housing enclosure 130 to form the battery connector system 110 and for providing a sealed electrical path from the battery to the battery powered device 100.

In accordance with embodiments described above, the implementation of the disclosure produces water tight and shock proof mechanism for sealing the electrical connection between the battery and the battery powered device 100, and thereby providing uninterrupted power supply to the battery powered device 100. The processes of insert molding and over molding (910 and 915) provide for a robust sealing of the battery and reduces formation of potential leak paths (605, 705, and 805). Further, the geometry of the insert molded contact block 125 is implemented to keep the insert molded contact block 125 intact during the processes of insert molding and over molding (910 and 915) and further to protect the geometry during extreme heat and pressure conditions. Also, the geometry of the insert molded contact block 125 is such as to increase resistance to potential leak paths (605, 705, and 805) and drop impacts. Further, the described system has been tested under seven loops of drop impacts to ensure an uninterrupted power supply even in extreme drop situations, thereby ensuring that the battery connector system 110 is functional under extreme drop conditions while maintaining a water tight seal.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery connector system, for connecting a battery to a battery powered radio device, the battery connector system comprising:

an insert molded contact block comprising:

a contact block having an o-ring groove;

a plurality of insert molded electrical contacts insert molded into the contact block, and an outer electrical connection located on the insert molded contact block for electrically coupling the battery to the battery powered radio device;

a housing enclosure for receiving cells and circuitry, the housing enclosure being formed of an overmold material extending from the insert molded contact block, the overmold material being bonded to the insert molded contact block;

an inner electrical connection disposed on the housing enclosure for electrically coupling the cells and circuitry housed within the housing enclosure to the outer electrical connection through the plurality of insert molded electrical contacts; and a sealed electrical path between the inner electrical connection and the outer electrical connection, wherein the sealed electrical path is formed by a water resistant sheet surrounding the inner electrical connection and by the bond created between the insert molded contact block and the overmold material.

2. The battery connector system as claimed in claim 1, further including a sealing mechanism for sealing one or more potential leak paths formed along the insert molded electrical contacts during one or more of the insert molding and the over molding.

3. The battery connector system as claimed in claim 1, wherein the insert molded contact block includes:

a locking feature proximal to the outer electrical connection; and a perimeter back angle along a bottom curvature portion of the insert molded contact block.

4. The battery connector system as claimed in claim 1, comprising an O-ring disposed in the o-ring groove of the contact block forming a radial seal between the battery and the battery powered radio device.

5. The battery connector system as claimed in claim 4, wherein the O-ring is fabricated from a material comprising at least one of a silicon, a nitrile, a fluorocarbon, a chloroprene rubber, a thermoplastic elastomer, a thermoplastic urethane, and an ethylene propylene rubber.

6. The battery connector system as claimed in claim 1, wherein the water resistant sheet is fabricated from a material comprising at least one of a plastic, a water resistant label, and a paint.

7. A communication device comprising:

a radio having radio contacts;

a battery connector system comprising:

an insert molded contact block comprising:

a contact block having an o-ring groove;

a plurality of insert molded electrical contacts insert molded into the contact block, and an outer electrical connection located on the insert molded contact block for electrically coupling to the radio contacts;

a housing enclosure for receiving cells and circuitry, the housing enclosure being formed of an overmold material, the overmold material also being bonded to the insert molded contact block;

an inner electrical connection disposed on the housing enclosure for electrically coupling the cells and circuitry housed within the housing enclosure to the outer electrical connection through the plurality of insert molded electrical contacts;

a sealed electrical path between the inner electrical connection and the outer electrical connection, wherein the sealed electrical path is formed by a water resistant sheet surrounding the inner electrical connection and by the bond created between the insert molded contact block and the overmold material; and an o-ring seated within the o-ring groove, the o-ring providing a radial seal between the battery connector system and the radio.

8. The communication device as claimed in claim 7, wherein the insert molded electrical contacts are extended from the outer electrical connection to the inner electrical connection.

9. The battery connector system as claimed in claim 1, wherein the bond provides shock proofing of the battery connector system.

10. The communication device as claimed in claim 7, wherein the bond provides shock proofing of the battery connector system.

11. The battery connector system as claimed in claim 1, wherein the size and the shape of the insert molded electrical contact block is different from an outer edge of the housing enclosure.

12. The communication device as claimed in claim 7, wherein the size and shape of the insert molded electrical contact block is different from an outer edge of the housing enclosure.

13. The battery connector system as claimed in claim 1, wherein the over molding is a multi-material molding process along with insert, two-shot or sandwich molding.

14. The battery connector system as claimed in claim 13, wherein the over molding process includes injection molding around, over, under or through a substrate material done using multishot process or insert molding process.

15. The communication device as claimed in claim 7, wherein the over molding is a multi-material molding process along with insert, two-shot or sandwich molding.

16. The communication device as claimed in claim 15, wherein the over molding process includes injection molding around, over, under or through a substrate material done using multishot process or insert molding process.

17. The battery connector system as claimed in claim 1, wherein the battery housed within the housing enclosure is not housed within the contact block.

18. The communication device as claimed in claim 7, wherein the battery housed within the housing enclosure is not housed within the contact block.

19. The battery connector system as claimed in claim 1, wherein the outer electrical connection located on the insert molded contact block is formed at a position where the plurality of electrical contacts are insert molded with the contact block.

20. The communication device as claimed in claim 8, wherein the outer electrical connection located on the insert molded contact block is formed at a position where the plurality of electrical contacts are insert molded with the contact block.

* * * * *